United States Patent [19]

Holloway

[11] 4,411,444
[45] Oct. 25, 1983

[54] LOAD EQUALIZER

[76] Inventor: Robert W. Holloway, 471 Almond Dr., No. 6, Lodi, Calif. 95240

[21] Appl. No.: 352,202

[22] Filed: Feb. 25, 1982

[51] Int. Cl.³ .............................................. B62D 53/08
[52] U.S. Cl. .............................. 280/405 A; 280/423 R
[58] Field of Search ........... 280/406 R, 406 A, 405 R, 280/405 A, 405 B, 423 R

[56] References Cited

U.S. PATENT DOCUMENTS

| | | | |
|---|---|---|---|
| 2,727,755 | 12/1955 | Hume | 280/405 A |
| 2,847,230 | 8/1958 | Hendrickson et al. | 280/406 R |
| 2,941,818 | 6/1960 | Hubbard | 280/405 R |
| 2,996,312 | 8/1961 | Paul | 280/406 R |
| 3,035,855 | 5/1962 | Harris | 280/405 R |
| 3,227,470 | 1/1966 | Funk | 280/405 R |
| 3,363,914 | 1/1968 | Neel, Jr. | 280/405 R |
| 3,439,935 | 4/1969 | Guidice | 280/405 A |
| 3,580,609 | 5/1971 | Paielli | 280/405 R |
| 3,776,573 | 12/1973 | Paielli | 280/405 R |

*Primary Examiner*—John A. Pekar
*Attorney, Agent, or Firm*—Wells, St. John & Roberts

[57] ABSTRACT

A load equalizer for attachment to the gooseneck front end of a trailer connected by a fifth wheel hitch on the bed of a towing truck. The structure includes a rigid arm pivotally mounted relative to the trailer. It movably supports a post which engages a pad mounted to the truck bed. The arm and post transfer a portion of the weight of the towed trailer to the truck bed at a location forward of the fifth wheel hitch and truck rear axle so as to balance the respective load carried by the front and rear wheels of the truck while towing the trailer.

11 Claims, 5 Drawing Figures

LOAD EQUALIZER

FIELD OF THE INVENTION

This invention relates to load equalizers for transferring part of the weight of an overhanging trailer forward of a fifth wheel hitch and to the front wheels of a towing truck.

BACKGROUND OF THE INVENTION

This disclosure is concerned with distribution of weight between the front and rear axles of a towing truck, such as a pickup truck, when used for pulling trailers of the type having an overhanging gooseneck which is connected to a fifth wheel hitch at the rear portion of the truck bed.

It is conventional to mount the fifth wheel hitch in a truck bed so that the kingpin axis pivotally interconnecting the truck and trailer is directly above the rear axle of the truck. This leaves adequate room for turning of the trailer, both between the rear end of the truck and the lower portions of the trailer, and between the front end of the gooseneck and the forwardly spaced truck cab. However, the result is that the load of the trailer is primarily exerted on the rear wheels of the truck. This often reduces the load on the truck front wheels, affecting steering and road stability, as well as headlight patterns.

To balance the weight of the towed trailer between the front and rear axles of the towing truck, this invention adds a forwardly protruding arm mounted to the trailer and operatively engaged with the bed of the truck for transferring weight to the truck bed forward of the truck rear axle. The pressure between the arm and truck bed is adjustable to permit balancing of differing trailer loads. The arm is pivoted independently of the trailer and its movement is physically limited so that it does not swing appreciably from side to side in response to the normal turning of the truck and trailer relative to one another.

DESCRIPTION OF THE DRAWINGS

The drawings illustrate a preferred form of the invention in which.

DESCRIPTION OF THE PREFERRED EMBODIMENT

Figure 1:
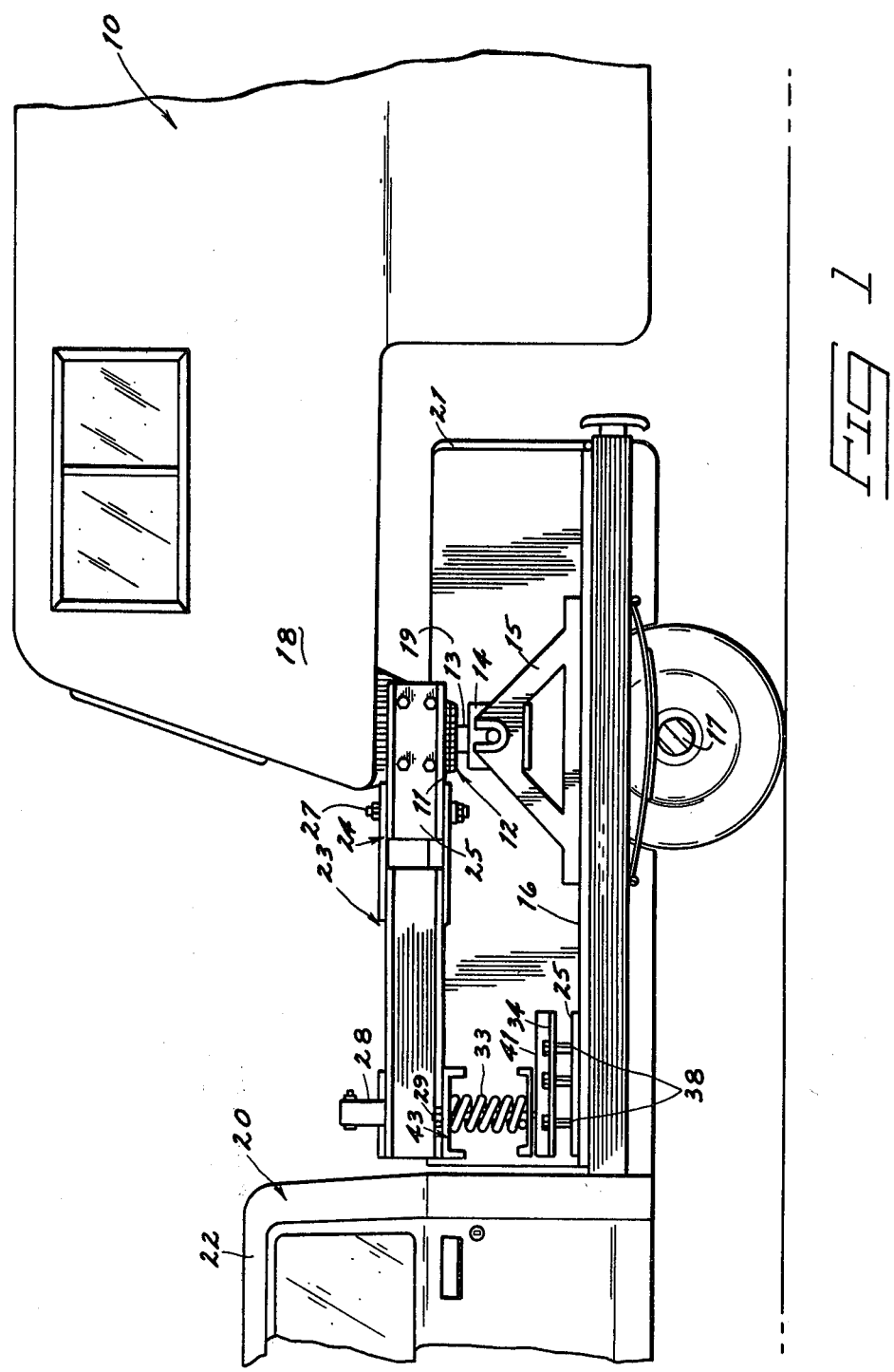
FIG. 1 is a side elevation of the truck and trailer with a side panel of the truck broken away
Figure 2:
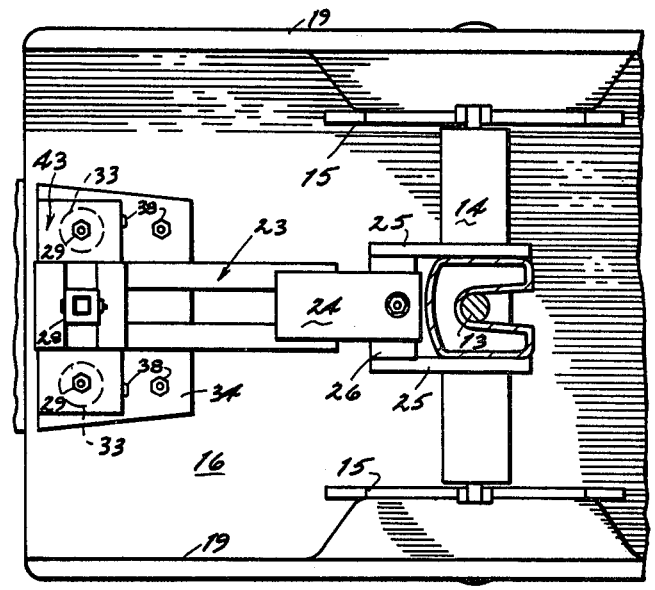
FIG. 2 is a sectional view taken along line 2—2 in FIG. 1.
Figure 3:
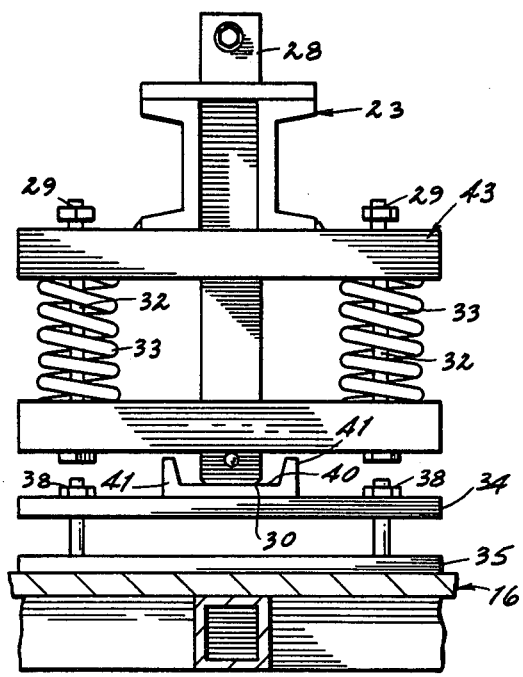
FIG. 3 is an enlarged sectional view taken along line 3—3 in FIG. 1; 4 is an enlarged sectional view taken along line 4—4 in FIG. 1.
Figure 4:
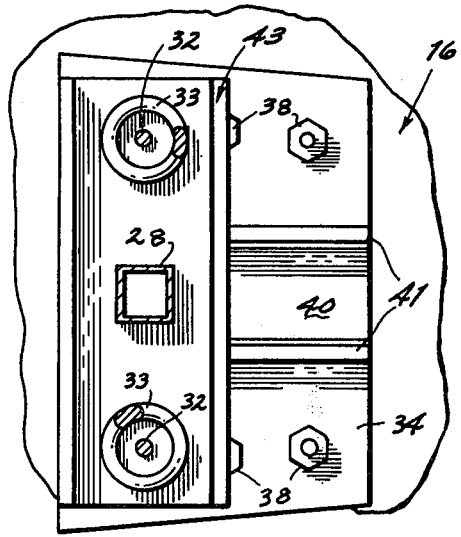
FIG. 4 is an enlarged sectional view taken along line 4—4 in FIG. 1.

In accordance with the constitutional purpose of promoting the progress of science and the useful arts (Article 1, Section 8), I hereby disclose the following preferred embodiment of my invention. The invention is illustrated as it would be typically utilized between a towed travel trailer 10 and a towing pickup truck 20. The purpose of the invention is to direct some of the weight of the towed trailer to a location on the truck bed 16 forward from the rear axle 17 above which the fifth wheel 12 is typically located. This is accomplished with minimum disruption or attachment to the truck bed 16, leaving the truck bed substantially unobstructed for normal usage when the trailer 10 is not being towed.

While the specific embodiment shown in the drawings is designed for attachment to an existing trailer and requires no modification of the conventional hitch by which the trailer is mounted to the fifth wheel within the truck bed, it is to be understood that the invention can also be incorporated in the fifth wheel hitch components mounted on the front of the trailer. In such an instance, the rigid arm 23 described in detail below might be pivotally connected to the trailer about the kingpin axis, rather than about a separate parallel axis as described in detail below.

The load equalizer is designed for a trailer 10 of the type having an elevated gooseneck 18 which partially overlaps the rear bed 16 of a towing truck 20. The truck bed 16 is bounded by side panels 19 and a rear panel or tailgate 21, which typically dictate the required elevational clearance between the ground and the lower surface of gooseneck 18. The front of the truck bed 16 is traversed by the forward truck cab 22. As seen in FIG. 1, there is typically a substantial separation between the truck cab 22 and the front end of gooseneck 18. This separation is due to the fact that the trailer hitch assembly must be mounted under the front end of the gooseneck, and it is desirable that the hitch be located above the truck rear wheels to permit much of the weight of the trailer to be applied to the load-supporting rear wheels of the truck bed. However, under towing conditions, the trailer can overload the rear wheels, causing the front wheels to be unloaded and affecting steering and road stability of the truck.

Trailer 10 is adapted to be connected to a fifth wheel 12 mounted to the truck bed 16 above a truck rear axle 17. Such positioning of the gooseneck 18 assures that there is adequate clearance between the front end of the gooseneck and the truck cab 22 to accommodate all degrees of pivotal movement that might occur between the truck and trailer, including turning conditions where the truck 20 is perpendicular to trailer 10.

A forwardly extended rigid arm 23 is provided in the present load equalizer. It has opposed front and rear ends. It is typically in a substantially horizontal orientation relative to the truck and trailer, but its orientation will depend upon truck and trailer loading adjustments, as well as the nature of the terrain supporting the truck and trailer wheels. The rigid arm 23 is pivotally connected to the front of trailer 10 about an upright axis centered through a bolt assembly that serves as a pivot shaft 27 between arm 23 and trailer 10. The shaft axis is upright and perpencidular to the length of rigid arm 23. Arm 23 is free to pivot independently of trailer movement. It can be folded to the side about shaft 27 when not in use.

An upright post 28 depends downwardly from the front end of the rigid arm 23. Its lower end is adapted to be positioned adjacent to the truck cab 22 at the forward end of the truck bed 16. Post 28 is movably carried by rigid arm 23 for elevational movement of its lower end relative to the arm 23. In the illustrated embodiment, post 28 is slidably mounted along an axis parallel to the axis of shaft 27 and perpendicular to rigid arm 23.

Yieldable means, shown as compression springs 33, are operably connected between the rigid arm 23 and post 28. They preload the rigid arm 23 when trailer 10 is mounted to truck 20 and resist downward motion of rigid arm 23 relative to post 28 during travel of the trailer.

A pad 34 is adapted to be fixedly mounted to a truck bed 16 in slidable abutting engagement with the lower end of post 28. The rigid arm 23, post 28, and pad 34 direct a portion of the weight of the towed trailer 10 to the truck bed 16 at a location forward from the truck rear axle 17 and immediately adjacent to the cab 22. The balancing of the forces applied to the front and rear truck axles can be selectively adjusted by design of the load equalizer components and by varying the elevational positions of these elements with respect to one another, as will be described below.

Taking the elements of the load equalizer in greater detail, the illustrated attachment structure is designed to be mounted to the support structure for a bearing plate 11 which overlies a fifth wheel 12 at the rear of truck bed 16. The fifth wheel 12 is typically carried on a transverse support 14 which is pivotally mounted to side frames 15 fixed to the truck bed 16 above the truck rear axle 17. A kingpin 13 interconnects the bearing plate 11 and fifth wheel 12 for pivotal movement of the towed trailer 10 about the kingpin axis.

To distribute a portion of the trailer weight to a location on truck bed 16 forward from the rear axle 17, a forwardly protruding rigid arm 23 is mounted to the bearing plate assembly on the front of the trailer gooseneck 18. As shown, the rigid arm 23 is supported by a fixed bracket 24 which has a transverse section 26 joined by a pair of mounting legs 25 that straddle the sides of the bearing plate structure. Legs 25 can be bolted or welded to the sides of the bearing plate assembly, four bolts being shown for this purpose in FIG. 1.

The rear end of rigid arm 23 is interconnected to the center of the transverse section 26 of bracket 24 by a bolt assembly that serves as a pivot shaft 27. The axis of shaft 27 is parallel to the kingpin axis of the fifth wheel hitch. This permits relative pivotal movement between rigid arm 23 and trailer 10 without binding of shaft 27.

The front end of rigid arm 23 slidably supports a perpendicular post 28, which extends downwardly from arm 23 to a lower end surface 30. The lower end surface 30 across post 28 is slightly rounded or convex to accommodate relative movement between the trailer and truck bed. The compression springs 33, which yieldably resist relative downward movement or rigid arm 23 with respect to post 28, are interposed between a first transverse bar 31 fixed to the underside of arm 23 and an opposed second transverse bar 32 held in place on post 28 by the protruding ends of a removable bolt assembly 43. The removable bolt assembly 43 permits removal of bar 32 and springs 33 for replacement or substitution purposes to match the loads encountered in specific truck-trailer combinations.

Individual vertical bolt assemblies 29 are shown extending through springs 33. They are optional and can be deleted from the structure. They would be loose during use of the hitch for towing purposes, thereby allowing springs 33 to extend or retract in response to longitudinal shifting of trailer 10. The bolt assemblies can be tightened to preload springs 33 prior to release of the trailer hitch. In this manner it is not necessary to work in opposition to the spring pressure when disconnecting or later reconnecting the fifth wheel hitch components.

The lower end surface 30 of post 28 is a bearing surface adapted to engage an upper surface of pad 34 in surface-to-surface contact. The engaged surface is the upper web of an inverted channel 40. The engaged surface is bounded along opposite sides by a pair of upper channel flanges 41. Flanges 41 are spaced apart by a distance greater than the width of the lower end surface 30 across post 28. The length and width of channel 40 is adequate to accommodate longitudinal and pivotal movement of the lower end surface 30 due to motion of pivot shaft 27 in response to relative pivotal movement between trailer 10 and truck 20. The lower end surface 30 of post 28 is free to slidably move about the upper surface of channel 40 within the limiting boundaries of flanges 41, while continuously exerting vertical forces on the channel 40 and pad 34.

The pad 34 is adjustably mounted on a supporting base 35 which is fastened or mounted to the bed 16 of the towing truck 20. This elevational movement between pad 34 and base 35 is provided by a plurality of adjusting bolt assemblies 38 which extend between them. By manipulation of the bolt assemblies, the pad 34 can be raised or lowered relative to base 35.

Figure 5:
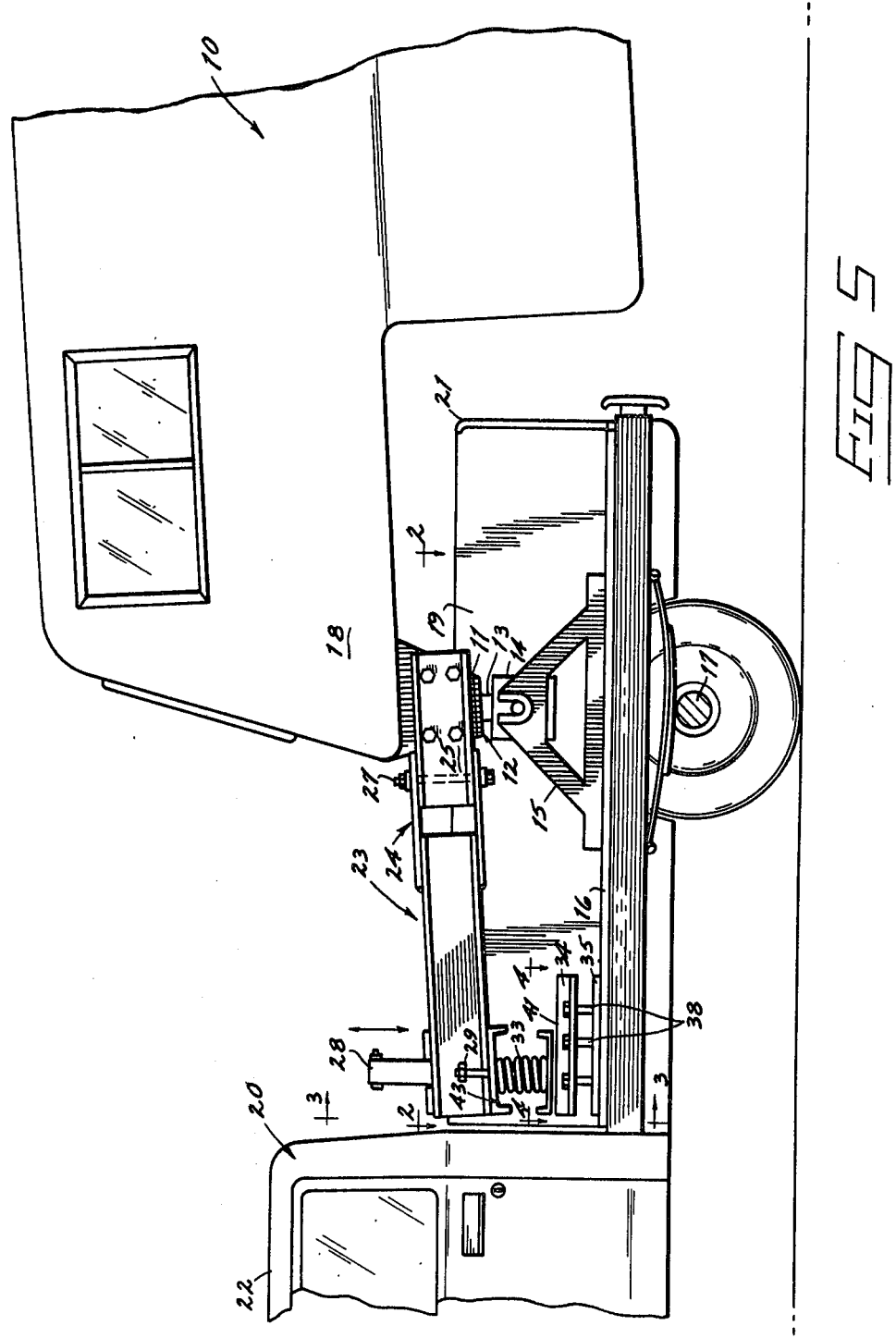
FIG. 5 is a side elevation similar to FIG. 1, illustrating the trailer in a raised angular position.

In use, the springs 33 are selected to match the loads that will be applied from the front end of rigid arm 23 to the supporting pad 34. The initial loading with the trailer in place can be preset by manipulation of the adjusting bolt assemblies 38 between base 35 and pad 34. By raising or lowering pad 34, one can transfer more or less of the weight of the towed trailer to the front of the truck. Since the rigid arm 23 will pivot in unison with trailer 10 about the transverse pivotal support of the fifth wheel 12, such movement is accommodated by the ability of post 28 to slide within rigid arm 23. Because the resulting movement of arm 23 relative to post 28 will vary the compression of springs 33, the loading transferred to the front wheels of truck 20 due to longitudinal pivoting between the truck and trailer when moving up a ramp, curve or other structure is substantially constant. Such movement is illustrated in FIG. 5.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A load equalizer for a trailer of the type having an elevated gooseneck which partially overlaps the rear bed of a towing truck where the rear bed is bounded by side and rear panels and a forward cab, the trailer being adapted to be connected to a fifth wheel mounted to the truck bed above a truck rear axle, said load equalizer comprising:

a forwardly extended rigid arm having a front end and rear end, said rigid arm being pivotally connected to the front of the trailer about an upright axis perpendicular to the length of the rigid arm;

an upright post depending downwardly from the front end of said rigid arm to a lower end adapted to be positioned adjacent to the cab of the towing truck, said post being mounted for elevational movement relative to said rigid arm;

yieldable means operably connected between said rigid arm and post for resisting downward motion of said rigid arm relative to the post; and a pad adapted to be fixedly mounted to the bed of the towing truck in slidable abutting engagement with the lower end of said post at a location adjacent to the cab of the towing truck.

2. A load equalizer for attachment on a trailer of the type having an elevated gooseneck which partially overlaps the rear bed of a towing truck where the bed is bounded by side and rear panels and a forward cab, the trailer having a bearing plate and kingpin adapted to be connected to a fifth wheel mounted on the truck bed above a truck rear axle, thereby permitting turning movement between them about the kingpin axis;

said load equalizer comprising:

a forwardly extended rigid arm having a front end a rear end, said rigid arm being adapted to be operably mounted to said bearing plate about an axis parallel to the kingpin axis;

an upright post depending downwardly from the front end of said rigid arm to a lower end adapted to be positioned adjacent to the cab of the towing truck, said post being mounted for elevational movement relative to said rigid arm;

yieldable means operably connected between said rigid arm and post for resisting downward motion of said rigid arm relative to the post; and a pad adapted to be fixedly mounted to the bed of the towing truck in slidable abutting engagement with the lower end of said post at a location adjacent to the cab of the towing truck.

3. The load equalizer of claim 2 further comprising:

a rigid bracket having a transverse section joining a pair of mounting legs adapted to be attached to the sides of said trailer bearing plate structure;

and a connecting shaft pivotally engaged between the center of the bracket transverse section and the rear end of said rigid arm, the shaft axis being along said axis parallel to the kingpin axis of the trailer bearing plate structure when the bracket is fixed to the structure.

4. The load equalizer of claim 2 wherein said pad is adjustably mounted on a supporting base adapted to be fastened to the bed of the towing truck for permitting the elevational position of the pad relative to the base to be selectively buried.

5. The load equalizer of claim 2 wherein said pad has an upper surface bounded along opposite sides by a pair of upper flanges spaced apart by a distance greater than the width of the lower end of the post which extends between them.

6. The load equalizer of claim 2 wherein the lower end of said post comprises a bearing surface adapted to engage an upper surface of said pad in surface-to-surface contact.

7. A load equalizer for attachment on a trailer of the type having an elevated gooseneck which partially overlaps the rear bed of a towing truck where the bed is bounded by side and rear panels and a forward cab, the trailer having a bearing plate and kingpin adapted to be connected to a fifth wheel mounted on the truck bed above a truck rear axle, thereby permitting turning movement between them about the kingpin axis;

a rigid arm having a front end and a rear end, said rigid arm being adapted to be operably mounted to a bearing plate for movement about a first upright axis perpendicular to the rigid arm, said rigid arm being further adapted to extend generally forwardly in a substantially horizontal position from the trailer gooseneck to a location adjacent to the cab of a towing truck;

a vertical post slidably mounted by the front end of said rigid arm along a second upright axis parallel to said first upright axis, said post depending downwardly from the front end of the rigid arm to a lower post end;

spring means connected between said rigid arm and said post for resisting downward motion of said rigid arm relative to said post along the second vertical axis; and a pad adapted to be fixedly mounted to the bed of a towing truck in slidable abutting engagement with the lower end of said post at a location adjacent to the cab of the towing truck.

8. The load equalizer of claim 7, further comprising:

a rigid bracket having a transverse section joining a pair of mounting legs adapted to be attached to the sides of a trailer bearing plate structure; and a connecting shaft pivotally engaged between the center of the bracket transverse section and the rear end of said rigid arm along said first upright axis.

9. The load equalizer of claim 7 wherein said pad is adjustably mounted on a supporting base adapted to be fastened to the bed of the towing truck for permitting the elevational position of the pad relative to the base to be selectively buried.

10. The load equalizer of claim 7 wherein said pad has an upper surface bounded along opposite sides by a pair of upper flanges spaced apart by a distance greater than the width of the lower end of the post which extends between them.

11. The load equalizer of claim 7 wherein the lower end of said post comprises a bearing surface adapted to engage an upper surface of said pad in surface-to-surface contact.

* * * * *